United States Patent

Murawa et al.

Patent Number: 5,899,517
Date of Patent: May 4, 1999

[54] STRESS HOMOGENIZED RAIL WHEEL HAVING A WHEEL DISC CONNECTING WHEEL HUB AND WHEEL RIM

[75] Inventors: Franz Murawa; Jürgen Schneider, both of Bochum; Wilfried Bittner, Hattingen, all of Germany

[73] Assignee: VGS Verkehrstechnik GmbH, Bochum, Germany

[21] Appl. No.: 08/860,349

[22] PCT Filed: Nov. 20, 1995

[86] PCT No.: PCT/EP95/04561

§ 371 Date: Jun. 6, 1997

§ 102(e) Date: Jun. 6, 1997

[87] PCT Pub. No.: WO96/18512

PCT Pub. Date: Jun. 20, 1996

[30] Foreign Application Priority Data

Dec. 10, 1994 [DE] Germany ............... 44 44 077

[51] Int. Cl.$^6$ ............................ B60B 19/00
[52] U.S. Cl. ........................ 295/21; 295/1
[58] Field of Search ............. 295/1, 8, 21, 22, 295/24, 27, 28, 29, 31.1, 34

[56] References Cited

U.S. PATENT DOCUMENTS 4,307,910 12/1981 Rodney ................... 295/21 X

FOREIGN PATENT DOCUMENTS

| 0 111 212 A3 | 11/1984 | European Pat. Off. . |
| 0 638 444 A1 | 2/1995 | European Pat. Off. . |
| 1 275 568 | 8/1968 | Germany . |
| 2 331 738 | 8/1974 | Germany . |
| 23 46 144 | 4/1975 | Germany . |
| 750713 | 6/1956 | United Kingdom . |
| 93 13952 | 7/1993 | WIPO ................... 295/21 |

*Primary Examiner*—Russell D. Stormer
*Attorney, Agent, or Firm*—Proskauer Rose LLP

[57] ABSTRACT

A stress-homogenized track wheel with a wheel disk (3) which connects the wheel hub (1) and wheel rim (2) and decreases in thickness from the hub (1) towards the rim (2), the disk's outer surfaces merging via three-center curves as radial generatrices tangentially with the adjacent outer surfaces of the hub (1) and rim (2) is shown. In order to suppress stress peaks and reduce the stress across the radial width of the wheel disk, the two outer surfaces of the wheel disk (3) are defined in the radial central area (1) geometrically by radial straight generatrices ($Z3^*$,$Z3^{**}$) which intersect in the area between the three-center curves on the wheel rim (2).

14 Claims, 6 Drawing Sheets

STRESS HOMOGENIZED RAIL WHEEL HAVING A WHEEL DISC CONNECTING WHEEL HUB AND WHEEL RIM

The invention relates to a rail wheel having a wheel disc which connects a wheel hub and a wheel rim and which has a thickness decreasing from the wheel hub to the wheel rim and whose outer sides merge tangentially via compound curves as radially extending generatrices into the adjacent outer sides of the wheel hub and the wheel rim.

A rail wheel of the kind specified is known, for example, from DE-B-2 331 738.

Figure 1:
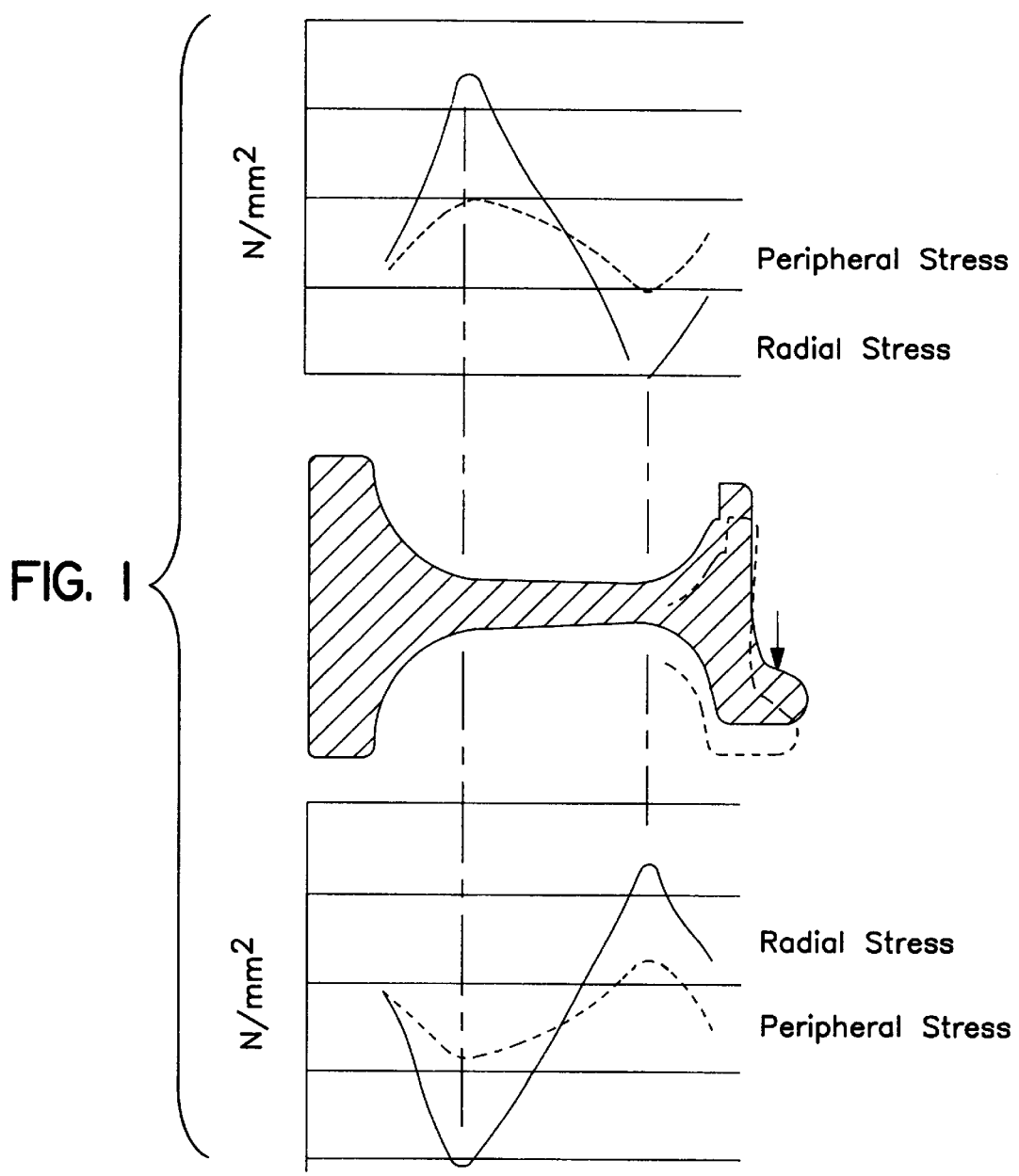

In disc-braked rail wheels of the kind specified, stressing mainly takes place in the transition zones from the wheel disc to the wheel rim and the wheel hub, due to the forces operative between wheel and rail during travel. The stresses are concentrated solely on a small area and then very rapidly decrease. A typical stress curve for a conventional wheel is shown in FIG. 1 (ERRI,/ORE Report B136/RP9 of the Research and Experimental Office of European Railways). Due to the concentrations of stress in small areas, at this place the material is loaded to the limit of its fatigue strength, while adjacent areas are still only slightly loaded. The wheel is therefore overdimensioned in these areas of low stress.

DE-A-2 346 144 discloses a set of light wheels for rail wheel vehicles which has wheel discs of light metal and steel rims, the wheel disc being shrunk on to the hub and the steel rim on to the wheel disc respectively. To reduce stress in that set of light wheels, inter alia metal adhesion is provided for the wheel disc and the wheel set shaft and also for the steel rim and the wheel disc. The wheel disc is also constructed with a straight web, to avoid the stress peaks which occur with undulated wheel discs.

It is an object of the invention to provide a rail wheel of the kind specified wherein local concentrations of stress are reduced in comparison with a conventional wheel.

This problem is solved according to the invention in a rail wheel of the kind specified by the feature that the two outer sides of the wheel disc are determined geometrically in the radial central zone by radially extending straight generatrices which intersect one another on the wheel rim in the zone between the compound curves.

As a result of this shaping of the rail wheel, no stress peaks occur in locally narrowly limited zones. The stresses are distributed over fairly large zones and their peaks reduced. Shaping according to the invention therefore produces an optimum light construction.

The central plane of the wheel disc lies perpendicularly to the wheel axis; however, it can also be inclined in relation to the wheel axis by an angle of up to 5°.

The wheel can be further improved by further steps for the object of the invention.

For manufacturing reasons it is advantageous in the forging and rolling of the wheel if the outer sides of the wheel hub adjacent the wheel disc are conical, the intersecting point of the straight generatrices of said outer sides determining the foot of the wheel disc on the wheel hub. Correspondingly the outer sides of the wheel rim adjacent the wheel disc can be conical, the intersecting point of the straight generatrices of said outer sides determining the foot of the wheel disc on the wheel rim.

To reduce stress peaks, advantageously the wheel disc has its minimum thickness in the range ⅔ to ⅘ of the distance of its foot on the wheel hub. Optimum conditions are obtained if the wheel disc has its minimum thickness at a distance $$C = 1.67 \times \frac{D}{LD} \cdot B$$

from the foot of the wheel disc on the wheel hub (where D=distance of the foot of the wheel disc from the wheel axis, B=distance of the feet of the wheel disc and LD=running circle diameter).

The axial distance of the straight generatrices of the outer side of the wheel disc at the foot of the wheel hub can be determined by the formula $$A \approx 15 + 8.5(f_D + f_F)$$

with the correctional factors $f_D$=LD:920 for the running circle diameter LD and $f_F$=Q:500+Y:120 for the wheel force Q (radial axle loading) and the rail force Y (axial force) on the wheel rim.

As a rule the transitions are made up of different zones. Preferably the wheel disc side transition zone extends from the wheel hub and/or the wheel rim to the wheel disc over a radial width $$E, F \approx 0.35B$$

of the wheel disc, measured from the particular feet of the wheel disc, with a distance B of the feet of the wheel disc. The wheel disc side transition zone from the wheel hub to the wheel disc is determined by the function $$Y_1 = E(2.292 \cdot 10^{-10} X_1^5 - 4.229 \cdot 10^{-8} X_1^4 + 2.930 \cdot 10^{-6} X_1^3 - 8.646 \cdot 10^{-5} X_1^2 + 1.070 \cdot 10^{-3} X_1).$$

The wheel disc side transition zone from the wheel rim to the wheel disc is determined by the following function $$Y_2 = F(4.870 \cdot 10^{-10} X_2^5 - 9.292 \cdot 10^{-8} X_2^4 + 6.229 \cdot 10^{-6} X_2^3 - 1.561 \cdot 10^{-4} X_2^2 + 1.656 \cdot 10^{-3} X_2).$$

The zone adjoining these transition zones of the wheel disc to the wheel hub preferably has a radius of curvature G=1.25 to 2.5·A (where A is the axial distance of the generatrices of the outer sides of the wheel disc at the foot on the wheel hub).

Correspondingly, the wheel rim side transition zone from the wheel disc to the wheel rim should have a radius of curvature H=0.75 to 2.0·A (where A is the axial distance of the generatrices of the outer sides of the wheel disc at the foot on the wheel hub).

Figure 2:
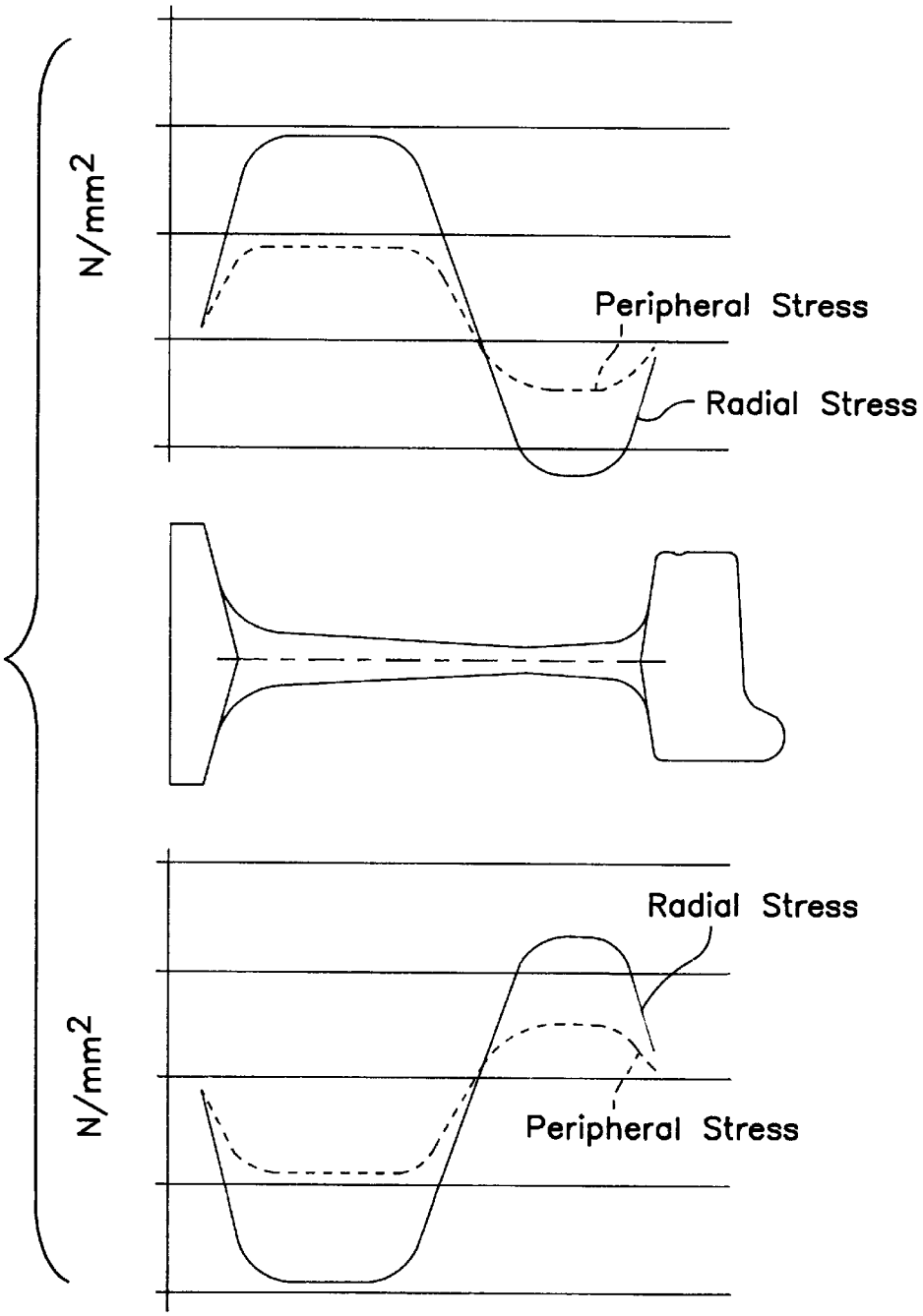
Figure 3:
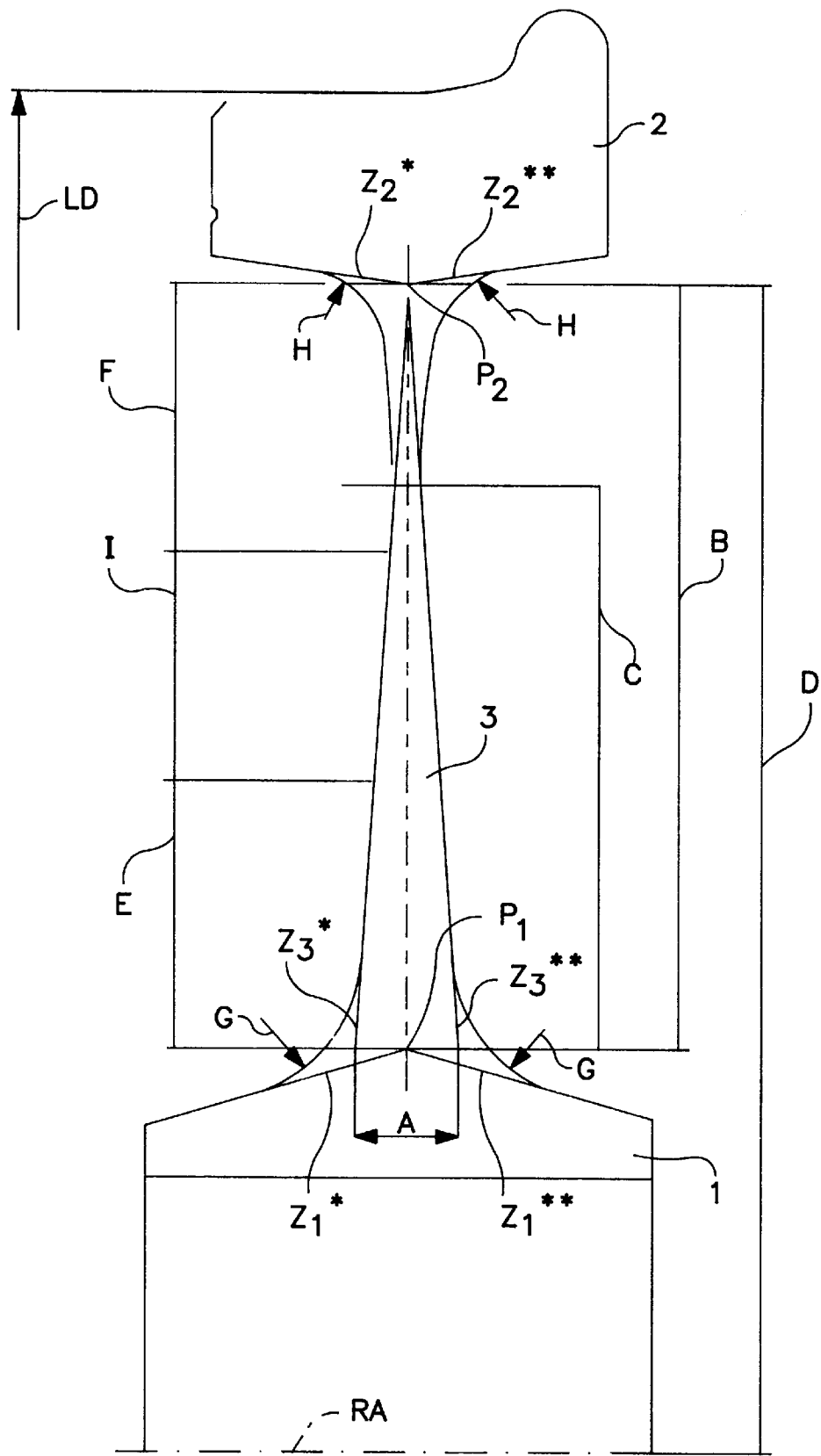
Figure 4:
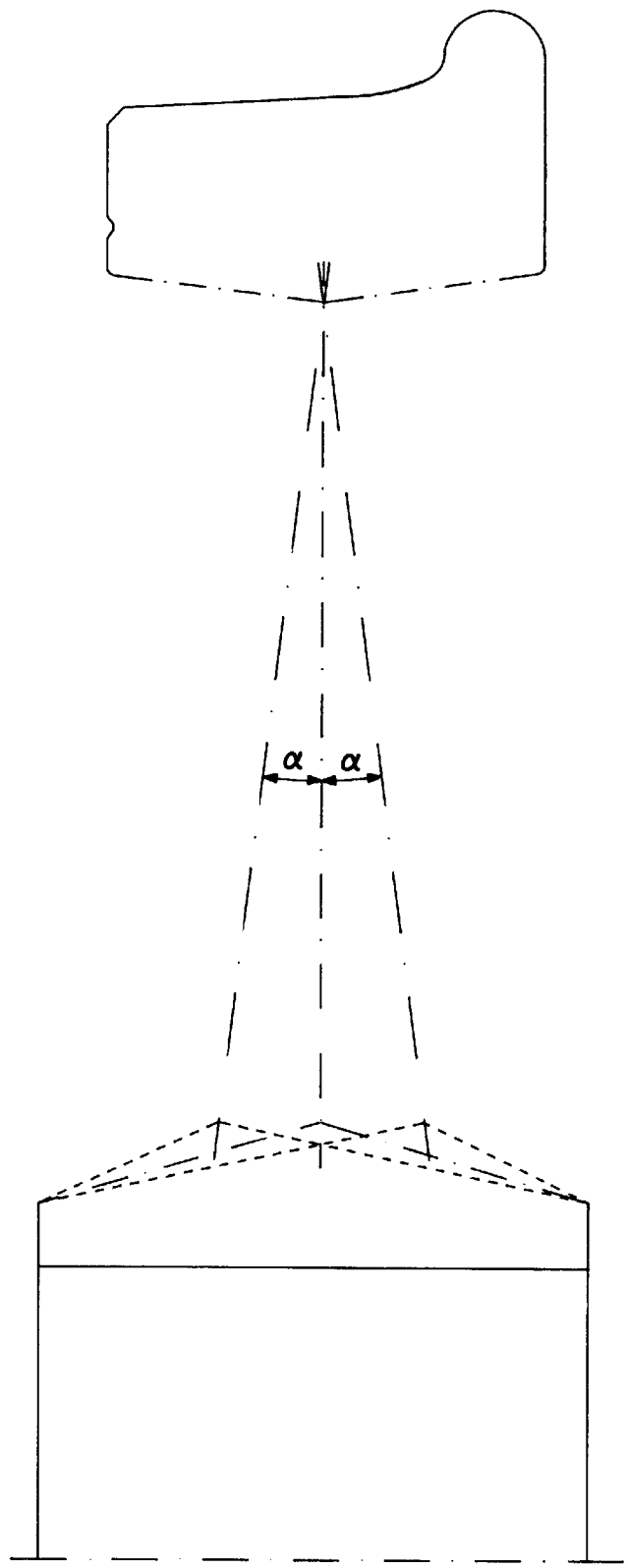
Figure 5:
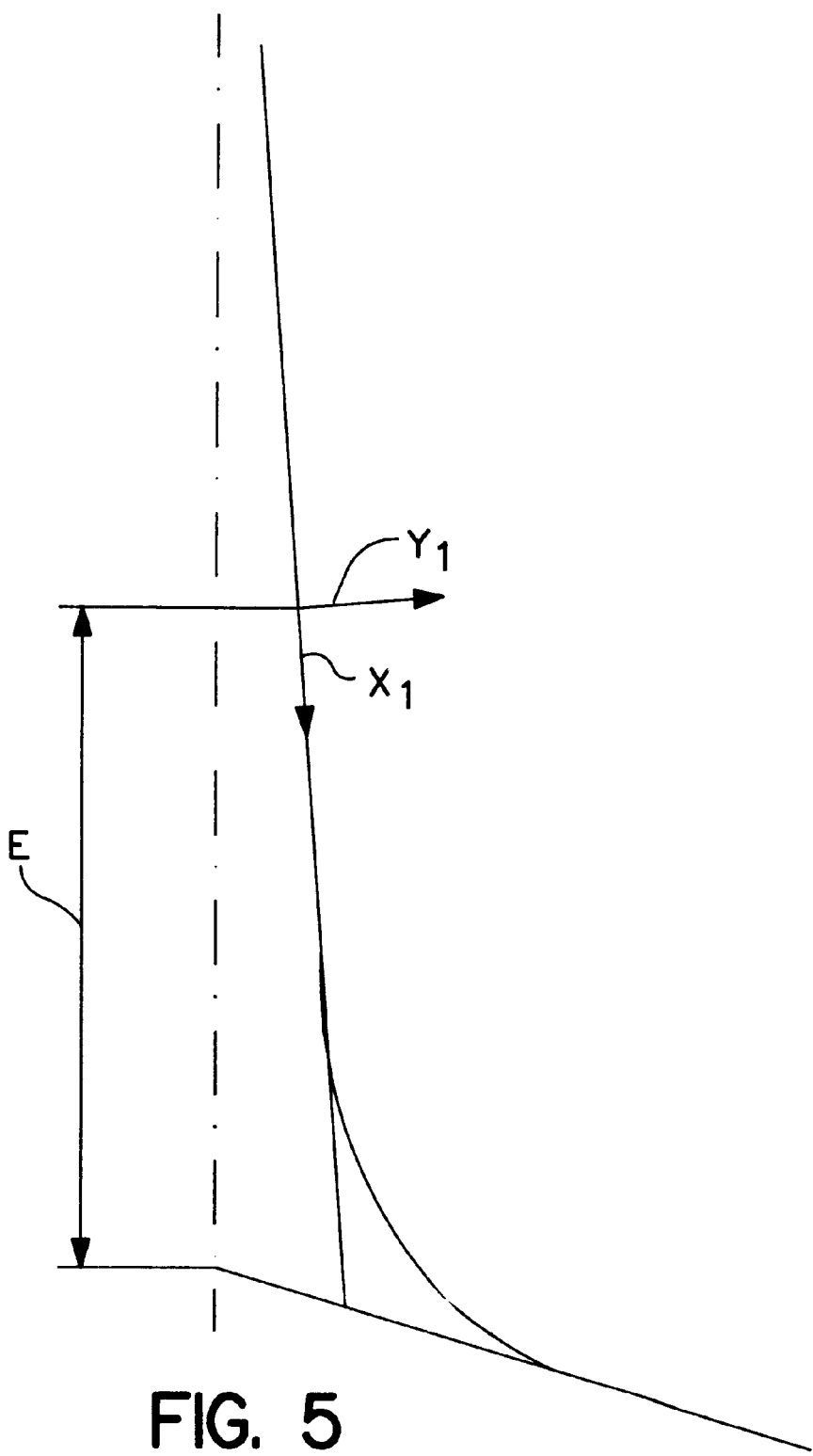
Figure 6:
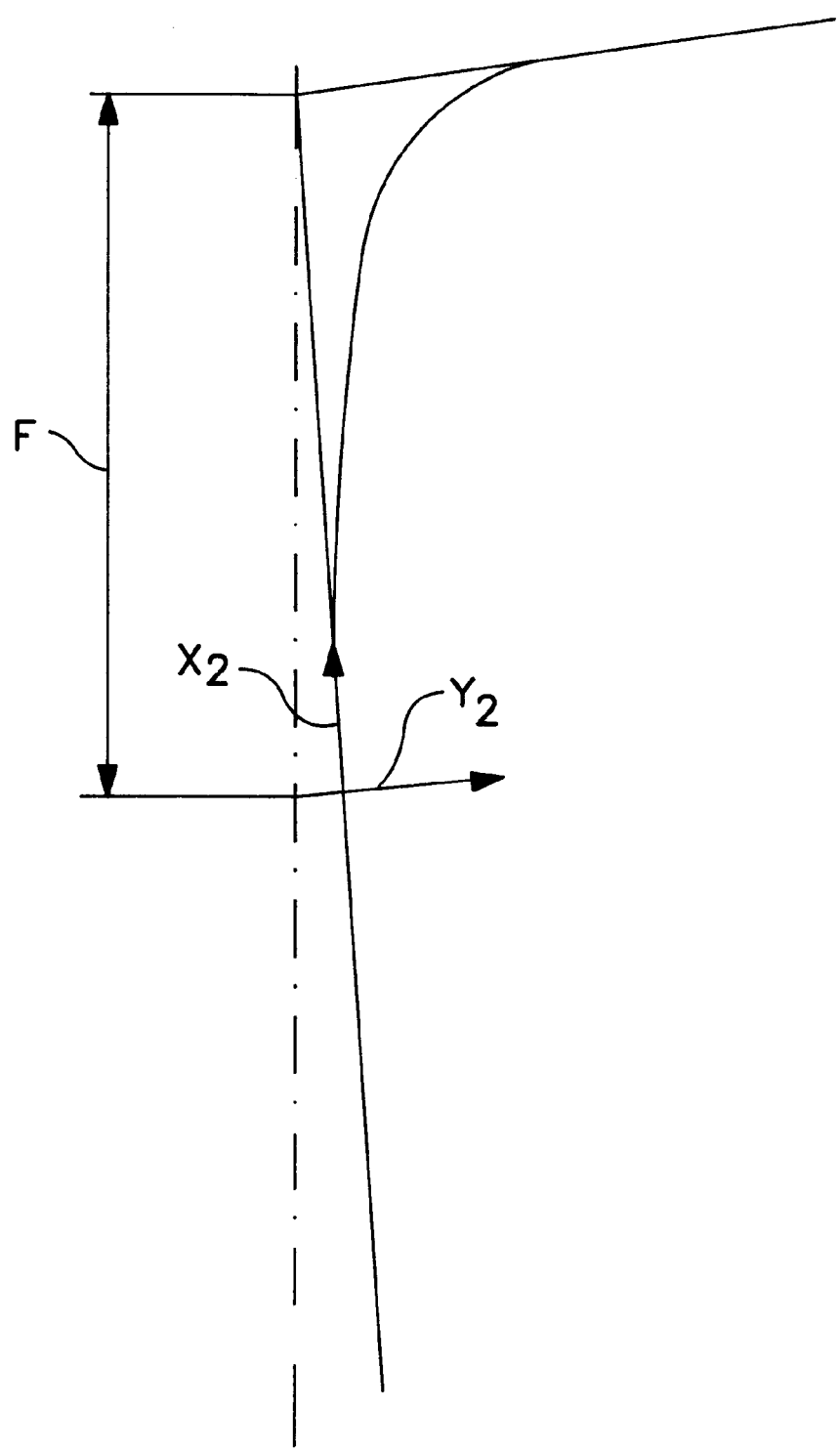

The invention will now be explained in greater detail with reference to an embodiment thereof illustrated in the drawings, which show:

FIG. 2 a rail wheel in half axial section with stress graphs for radial stress and peripheral stress (tangential stress) for both sides of the wheel disc, FIG. 3 a half section to an enlarged scale of the rail wheel shown in FIG. 2, FIG. 4 wheel hub and wheel rim of the rail wheel shown in FIGS. 2 and 3 for different inclinations of the wheel disc central plane, FIG. 5 the transition zone from the wheel hub to the wheel disc in a rail wheel as shown in FIGS. 2 and 3 to an enlarged scale, and FIG. 6 the transition zone from the wheel rim to the wheel disc in a rail wheel as shown in FIGS. 2 and 3 to an enlarged scale.

The rail wheel is constructed in the form of a solid wheel comprising a wheel hub 1 a wheel rim 2 and a wheel disc 3.

The wheel disc 3 stands with its central plane M perpendicularly on the wheel axis RA. Its outer sides are symmetrical in relation to said central plane M and merge via compound curves tangentially into the outer sides of the wheel hub 1 and the wheel rim 2. However, as shown in FIG. 4, the central plane M can also be inclined by an angle $\alpha +/-5°$.

The wheel disc side outer sides of the wheel hub 1 and the wheel rim 2 are conical. Their straight generatrices $Z1^*$, $Z1^{**}$, $Z2^*$, $Z2^{**}$ intersect one another at a point $P_1$, $P_2$ on the central plane M which forms the particular foot of the wheel disc 3 on the wheel hub 1 and the wheel rim 2. The outer sides of the wheel disc 3 are determined in the central zone E by radially extending straight generatrices $Z3^*$, $Z3^{**}$ which have at the wheel hub side foot $P_1$ an axial distance A and intersect one another on the wheel rim side between the transition zones, more particularly at the wheel rim side foot $P_2$.

The wheel disc 3 has a minimum thickness at distance C from the wheel hub side foot $P_1$. The distance C amounts to ⅔ to ⅘ of the distance B of the feet $P_1$, $P_2$. Preferably the distance is $$C \approx 1.67 \frac{D}{LD} \cdot B$$

where D is the distance of the foot $P_2$ from the wheel axis RA and LD is the running circle diameter of the wheel.

The central zone I with the radial straight generatrices $Z3^*$, $Z3^{**}$ of the wheel disc 3 extends at a distance $E \approx 0.35 \cdot B$ from the foot $P_1$ to a distance $F \approx 0.35 \cdot B$ from the foot $P_2$. Within certain limits, having regard to the rules of construction, the distance B of the feet $P_1$, $P_2$ is freely selectable for the wheel hub 1, the wheel rim 2 and the running circle diameter LD.

The compound curves for the transitions from the wheel disc 3 to the wheel hub 1 and the wheel rim 2 respectively are made up of two portions with different functions. Thus, the radius of curvature G in the portion adjacent the wheel hub is $G = 1.25$ to $2.5 \cdot A$, while the radius of curvature for the zone adjacent the wheel rim is $H = 0.75$ to $2.0 \cdot A$.

These are adjoined by the zones E and F, which satisfy the following functions $Y_1 = E(2.292 \cdot 10^{-10} X_1^5 - 4.229 \cdot 10^{-8} X_1^4 + 2.930 \cdot 10^{-6} X_1^3 - 8.646 \cdot 10^{-5} X_1^2 + 1.070 \cdot 10^{-3} X_1)$ $Y_2 = F(4.870 \cdot 10^{-10} X_2^5 - 9.292 \cdot 10^{-8} X_2^4 + 6.229 \cdot 10^{-6} X_2^3 - 1.561 \cdot 10^{-4} X_2^2 + 1.656 \cdot 10^{-3} X_2)$.

Although the invention has been explained with reference to the embodiment of a solid wheel having a one-piece wheel rim 2, it can also be advantageously applied to other rail wheels, such as a re-tirable solid wheel or a rubber-sprung wheel.

We claim:

1. A rail wheel, comprising:
    a wheel hub and a wheel rim;
    a wheel disc which connects the wheel hub and the wheel rim, each of the wheel hub and the wheel rim including outer sides adjacent the wheel disc, the wheel disc including a central radial zone in which the wheel disc has a thickness which decreases from the wheel hub to the wheel rim, the wheel disc further including an inner transition zone adjacent the wheel hub and an outer transition zone adjacent the wheel rim, outer sides of the wheel disc in the inner and outer transition zones presenting curved surface configurations which merge tangentially into respective ones of the outer sides of the wheel hub and the wheel rim adjacent the wheel disc, said curved surface configurations being defined by compound curves determined geometrically by radially extending generatrices, a surface configuration of outer sides of the wheel disc in the central radial zone being determined geometrically by radially extending straight generatrices which intersect one another on the wheel rim in the outer transition zone between the curved surface configurations of the outer sides adjacent the wheel rim.

2. A rail wheel according to claim 1, wherein a central plane of the wheel disc lies perpendicularly to a rotational axis of the rail wheel.

3. A rail wheel according to claim 1, wherein a central plane of the wheel disc is inclined in relation to a rotational axis of the rail wheel up to a maximum angle of about 5°.

4. A rail wheel according to claim 1, wherein the outer sides of the wheel hub adjacent the wheel disc are conical and which are determined by straight generatrices, an intersecting point of the straight generatrices of said outer sides of the wheel hub determining a radial location of the wheel hub side foot.

5. A rail wheel according to claim 1, characterized in that the outer sides of the wheel rim adjacent the wheel disc are conical and which are determined by straight 2generatrices, an intersecting point of the straight generatrices of said outer sides of the wheel rim determining a radial location of the wheel rim side foot.

6. A rail wheel according to claim 1, wherein a radial distance measured relative the wheel hub side foot at which position the wheel disc has a minimum thickness lies in the range of about ⅔ to ⅘ of the distance between feet on.

7. A rail wheel according to claim 6, characterized in that the radial distance is determined by the formula:

$C \approx 1.67 \, D/LD \cdot B$.

where C is the radial distance, D is the distance of the foot of the wheel disc on the wheel rim from a wheel axis, B is the distance between feet and LD is a running circle diameter of the rail wheel.

8. A rail wheel according to claim 1, wherein an axial distance between the radially extending straight generatrices which determine the surface configuration of outer sides of the wheel disc in the central radial zone at the radial position of the wheel hub side foot is determined by the formula;

$A \approx 15 + 8.5(f_F)$.

where $f_D + f_F$) are correctional factors, and wherein $f_D = LD:920$, where LD is a running circle diameter of the rail wheel, and wherein $f_F = Q:500 + Y:120$ where Q is a wheel force representing axial loading and Y is a rail force representing axial force at the wheel rim.

9. A rail wheel according to claim 1, wherein at least one of the inner and outer transition zones extends over a radial width of the wheel disc determined by the formula:

$E, F \approx 0.34B$.

where E and F are the respective radial widths of the inner and outer transition zones measured relative the wheel hub side foot and the wheel rim side foot, respectively, and B is the distance between feet.

10. A rail wheel according to claim 1, wherein a portion of the inner transition zone adjacent the wheel hub has a radius of curvature G=1.25 to 2.5·A, where A is an axial distance between the radially extending straight generatrices which determine the surface configuration of outer sides of the wheel disc in the central radial zone at the radial position of the wheel hub side foot.

11. A rail wheel according to claim 1, wherein a portion of the outer transition zone adjacent the wheel rim has a radius of curvature H=0.75 to 2.0·A, where A is an axial distance between the radially extending straight generatrices which determine the surface configuration of outer sides of the wheel disc in the central radial zone at the radial position of the wheel hub side foot.

12. A rail wheel according to claim 1, wherein a portion of the inner transition zone radially outward from the wheel hub side foot satisfies the functions;

$$Y_1 = E(2.292 \cdot 10^{-10} x^5_1 - 4.229 \cdot 10^{-8} X^4_1 + 2.930 \cdot 10^{-6} x^3_1 - 8.646 \cdot 10^{-5} x^2_1 + 1.070 \cdot 10^{-3} x_1).$$

13. A rail wheel according to claim 1, wherein a portion of the outer transition zone radially inward from the wheel rim side foot satisfies the function:

$$Y_2 = F(4.870 \cdot 10^{-10} x^5_2 + 6.229 \cdot 10^{-6} x^3_2 - 2.561 \cdot 10^{-4} x^2_2 + 1.656 \cdot 10^{-3} x_2).$$

14. A rail wheel according to claim 1, further comprising a wheel hub side foot and a wheel rim side foot radially separated from each other by a distance between feet.

* * * * *